Dec. 14, 1943.  E. L. POTTER ET AL  2,336,567
SHIMMY DAMPENING APPARATUS FOR AIRCRAFT TAIL WHEELS
Filed July 23, 1941  4 Sheets-Sheet 1

Inventors
ELBERT L. POTTER.
BERNARD E. O'CONNOR.
by Charles H. Wills Atty.

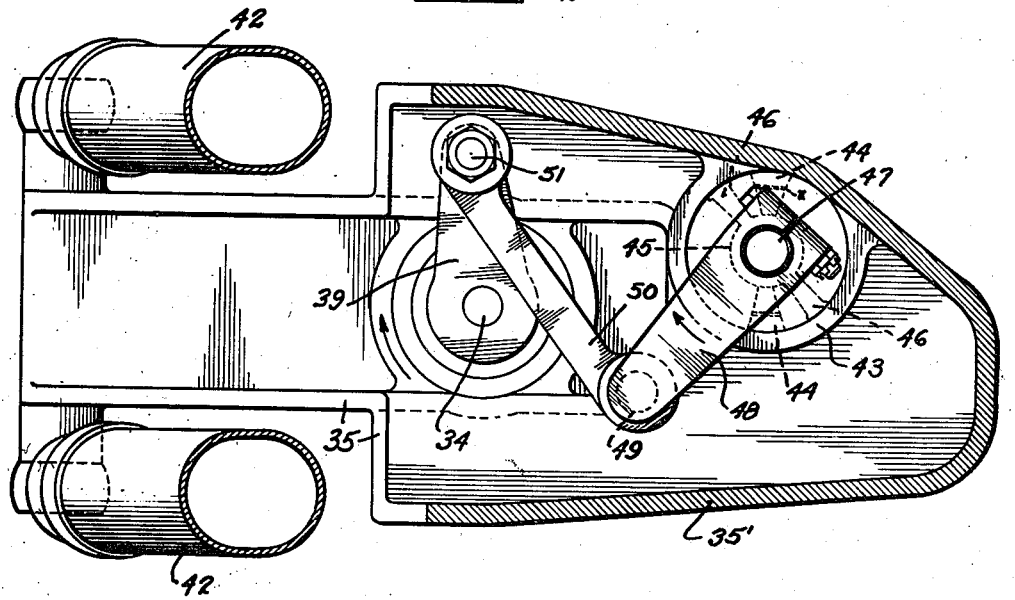
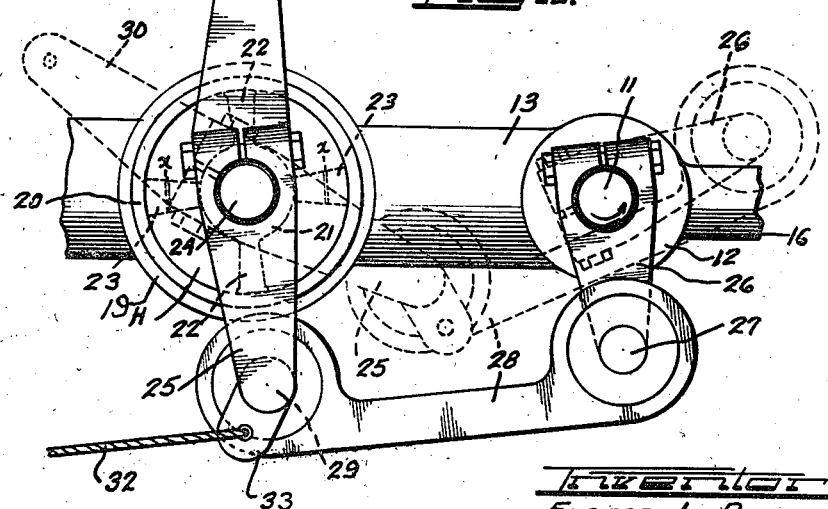

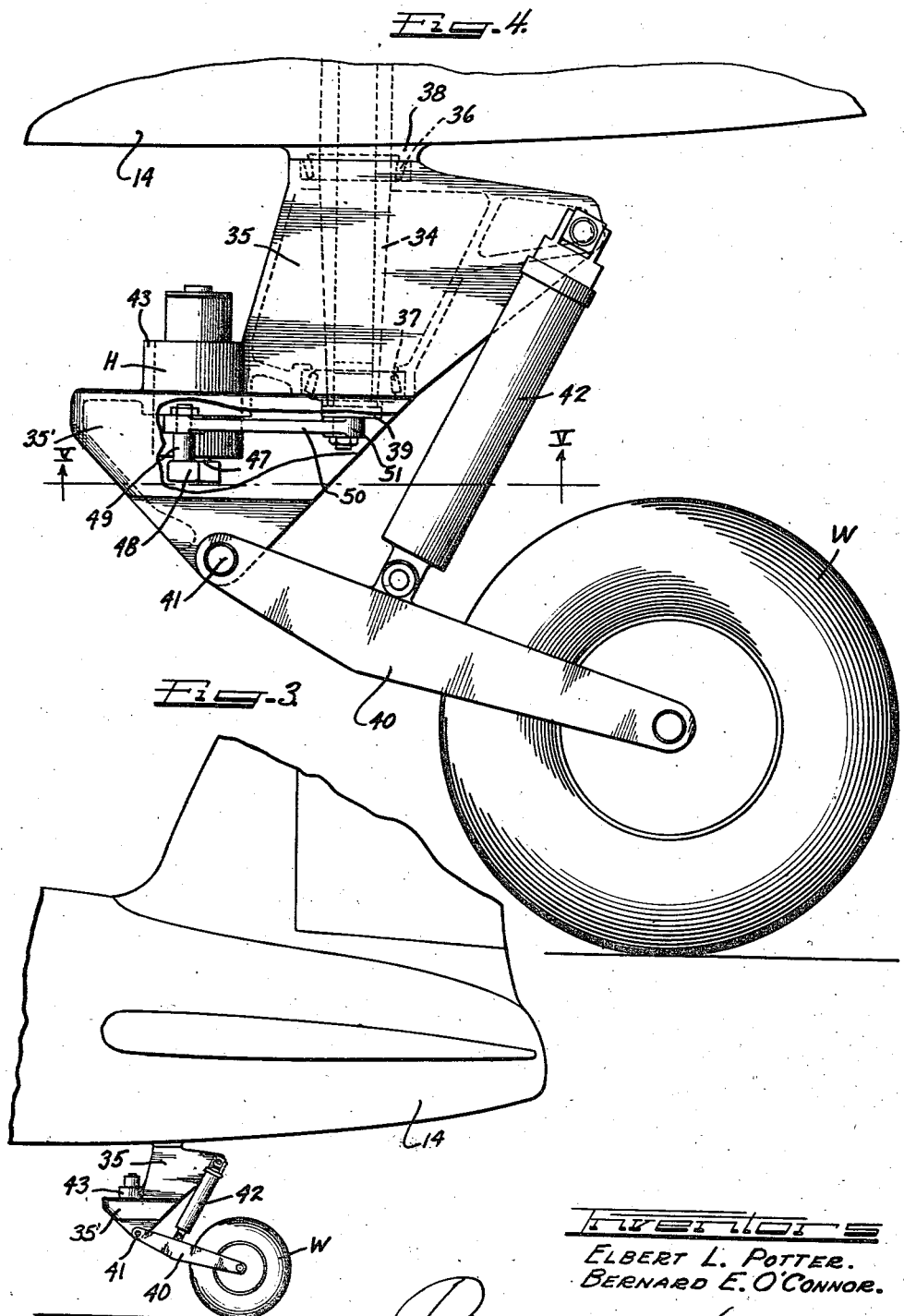

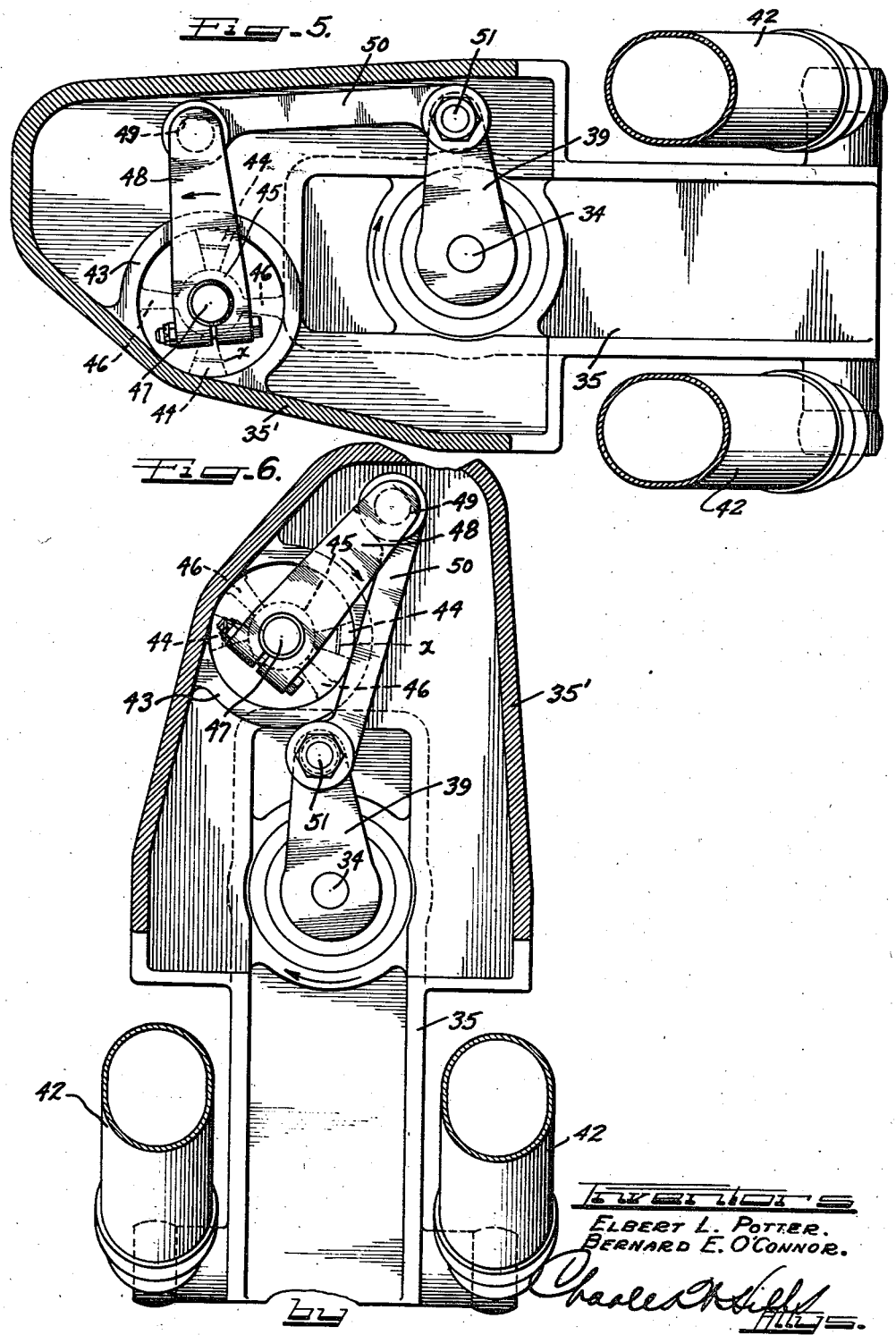

Patented Dec. 14, 1943

2,336,567

UNITED STATES PATENT OFFICE 2,336,567

SHIMMY DAMPENING APPARATUS FOR AIRCRAFT TAIL WHEELS

Elbert L. Potter and Bernard E. O'Connor, Buffalo, N. Y., assignors, by mesne assignments, to Houdaille-Hershey Corporation, Detroit, Mich., a corporation of Michigan Application July 23, 1941, Serial No. 403,642

10 Claims. (Cl. 244—50)

This invention relates to shimmy dampening apparatus adapted particularly for shimmy prevention of aircraft tail wheels or castering wheels.

In some airplanes, shimmy of the tail wheel is experienced. Such action is injurious to the maneuverability, to safe take-off and landing, and is harmful to the load, whether passenger or material, and detrimental to the plane structure. It is more prevalent in freely rotating or castering wheels where such wheels are desirable for steering on the runway, or for parking on the field or in the hangar.

The object of the invention is to provide dampening apparatus involving a dampening structure preferably of the oscillatory hydraulic type so connected with the wheel or its supporting structure that the wheel may caster infinitely, full 360° in either direction, about a spindle axis while the oscillating element of the hydraulic dampening structure oscillates through a lesser angle, usually less than 180°, and with the dampening structure adjusted so that during normal taxiing or maneuvering of the plane there will be little or no appreciable dampening, but whenever there is a tendency of the wheel to shimmy with short and rapid movement, dampening resistance will be set up in the dampening structure to prevent shimmying.

The various features of our invention are embodied in the structure shown on the accompanying drawings, in which drawings:

Figure 2 is an enlarged view on plane II—II of Figure 1;

Figure 3 is a side elevation of the rear end of an airplane showing a modified form of tail wheel assembly in which the tail wheel supporting structure is rotatable about a fixed spindle extending from the airplane body;

Figure 4 is an enlarged side elevation of the tail wheel assembly shown in Figure 3;

Figure 5 is an enlarged section on plane V—V of Figure 4;

Figure 6 is a view similar to Figure 5 but showing the relative arrangement of the parts after a rotation through 90° by the wheel structure; and Figure 7 is a view similar to Figure 5 showing the relative arrangement of the parts after a rotation through 180° by the wheel structure.

Figure 1:
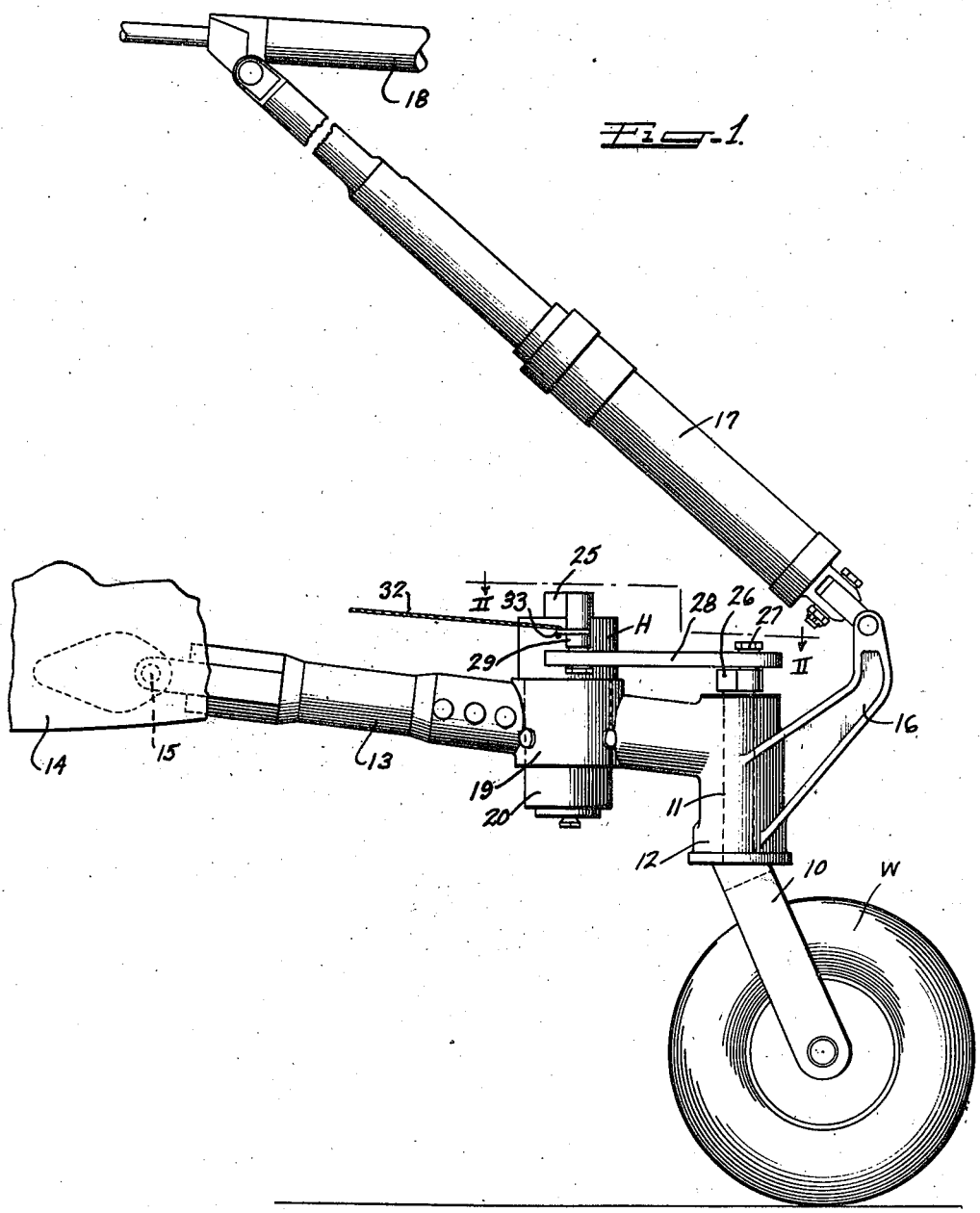
Figure 1 is a side elevation of a tail wheel assembly for aircraft in which the tail wheel is supported from a rotatable spindle.

Referring to Figures 1 and 2, the tail wheel W is mounted in the fork 10 at the lower end of a spindle 11 which extends upwardly through and has bearing in the end 12 of the wheel carrier arm or frame 13 which at its inner end may be hinged in any suitable manner to the airplane body 14, as indicated at 15, so that the arm 13, may swing vertically. A bracket 16 extending from the end 11 is connected by an oleo strut 17 with a retracting bar 18 on the airplane body adjustable thereon for lowering the tail wheel structure to service position or to an upper retracted position.

A distance forwardly of the bearing end 12, the arm 13 has the circular enlargement 19 in which is seated a housing 20 of the hydraulic dampening structure H. This hydraulic dampener or shock absorber may be of the oscillatory type as, for example, the type disclosed in Patent No. 2,229,660, dated January 28, 1941. On the structure shown, the frame 20 forms the cylinder element of the hydraulic dampener in which oscillates the piston structure. This piston structure has the hub 21 within the cylinder from which extend the vanes 22 which operate between the abutment 23 extending from the cylinder wall for displacement of fluid under restriction by suitable valving or orifice means, in a manner well understood in the art and as disclosed, for example, in Patent No. 2,229,660 referred to above.

In the arrangement shown, the piston shaft 24 extends upwardly from the hub 21 to the exterior of the cylinder and has the lever arm 25 secured to and extending therefrom.

At its upper end the spindle 11 for the wheel W has a lever arm 26 secured thereto which at its end has an upstanding pin 27 for receiving one end of a link 28, this link at its other end receiving the pin 29 depending from the end of the lever arm 25. The lever arms 25 and 26 are thus connected together by the link so that rotary movement of the wheel fork 10 will be communicated to the piston structure of the dampener H. With the type of dampener shown, the range of oscillation of the piston structure is less than 180°, and therefore, in order that the wheel fork may rotate completely around in either direction, the piston lever arm 25 is made proportionately longer than the spindle lever arm 26, the lever arms and the links then forming a crank mechanism between the dampener piston shaft and the wheel spindle. Referring to Figure 2, the lever arms are shown extending in the same direction and substantially parallel when the wheel is in its normal or neutral plane, and the piston vanes 22 are substantially midway between the abutments 23. If, during forward travel of the airplane, the wheel travels for counter-clockwise rotation (Figure 2) of the spindle, the link 28 will cause counter-clockwise movement of the piston, and this movement of the piston continues until the spindle has rotated counter-clockwise substantially 90° (dotted lines in Figure 2), the piston vanes having by this time moved close to the abutment 23 in counter-clockwise direction. Should the wheel continue to travel for continued counter-clockwise rotation of the spindle, the link 28 will cause reverse or clockwise rotation of the piston and, so long as the spindle continues its counter-clockwise rotation, the piston will be moved in clockwise direction until its vanes approach the abutments 23 in clockwise direction and then, during return of the spindle in clockwise direction to its normal position, the link will cause the piston to move in counter-clockwise direction back to its normal position shown by the full lines on Figure 2. Thus, while the wheel supporting structure performs a complete rotation cycle, the piston structure of the hydraulic dampener will perform only a partial rotary cycle in one direction or the other as determined by the link 28.

As shown, restricted passages or orifices X may be provided in the abutments 23 for resisting the flow of the fluid displaced upon oscillation of the piston structure. Flow passages controlled by adjustable valves could be used, such as shown in Patent No. 2,229,660 referred to hereinbefore. The adjustment for hydraulic flow resistance in the dampener may be such that during normal taxiing or maneuvering of the plane there will be little or no appreciable hydraulic dampening of the spindle because of the slow oscillating speed of the dampener shaft, but when there is a tendency toward short and very rapid or shimmying movements of the wheel and spindle, the dampener will set up a dampening resistance which will counteract the tendency toward such short and rapid movements, and shimmying will then be prevented.

If it is desired to use the tail wheel for steering of the airplane, this can be readily accomplished by rotation of the dampener shaft from the cockpit of the airplane. As shown, a lever arm 30 extends oppositely from the lever arm 25 for connection at its end with a steering cable 31, while the steering cable 32 connects with the lever arm 25. In order that the leverage length to the arm 25 may be the same as that of the arm 30, an extension 33 may be provided on the arm 25 for receiving the cable 32. Upon steering turning of the dampener shaft, the link 28 will transmit such steering rotation to the wheel spindle through the lever arm 26. Should the wheel attempt to shimmy during steering operation, such tendency will be checked and dampened by the dampener H, and accurate steering is therefore at all times assured.

In the arrangement shown on Figures 3 to 7, the spindle 34, around which the wheel structure revolves, is rigidly secured to and extends downwardly from the rear end of the airplane body 14. A frame 35, preferably in the form of a casting, receives the spindle and is journalled thereon for rotary movement by suitable low resistance bearings 36 and 37, the frame at its upper end having bearing against the bearing plate 38 from which the spindle extends.

The spindle 34 terminates in the lower portion 35' of the frame 35 and has the arm 39 rigidly secured thereto and extending laterally therefrom within the frame part 35'. A fork frame 40 is hinged at 41 to the lower end of the frame part 35' and extends rearwardly and receives between its ends the wheel W. As shown, twin oleo struts 42 extend between the fork frame and the rear end of the upper frame part 35, these oleo struts absorbing and dampening the vertical movement of the wheel during travel of the airplane on the ground.

The hydraulic dampener H is mounted on the lower frame part 35' in front of the upper frame part 35 and comprises the cylinder element 43 which may form an integral part of the cast frame. This cylinder element has the partitions or abutments 44 between which is the piston hub 45 with the vanes 46 extending therefrom for oscillation with the piston hub between the partitions. The piston shaft 47 extends from the hub downwardly into the frame part 35' and has the lever arm 48 secured to and extending laterally therefrom. A pin 49 extends upwardly from the end of the arm 48 and one end of the link 50 receives this pin, and the other end of the link receives and is rotatable on a pin 51 extending downwardly from the end of the arm 39 which is rigidly secured to the spindle 34.

As shown on Figure 5, when the wheel W is in its normal or neutral position, the lever arm 48 of the dampener extends in the same direction as and substantially parallel with the stationary arm 39 on the spindle 34. As in the arrangement of Figures 1 and 2, the length of the lever arm 48 is so proportioned relative to the length of the stationary arm 39 that for each complete rotation of the wheel supporting frame 35 around the spindle 34 the dampener shaft will oscillate through a range less than 180°. Figure 6 shows the relative positions of the parts after rotation of the frame 35 through 90° in clockwise direction (Figure 5). During such clockwise rotation from the normal position in Figure 5 to the 90° position of Figure 6, the shaft arm 48 will rotate in counter-clockwise direction for counter-clockwise swing of the piston vanes toward the abutments 46. As the frame rotation continues in clockwise movement to the 180° position shown in Figure 7, the dampener shaft is rotated by the link 48 in clockwise direction for clockwise movement of the piston vanes toward the opposite sides of the abutment 46, and then as the frame 35 continues in its clockwise rotation to complete the 360° cycle, the dampener shaft will be returned to the normal or neutral position shown on Figure 5. Any tendency toward abrupt, rapid, or shimmy movement of the wheel structure will be hydraulically resisted by the dampener structure.

We have thus provided simple, compact, and efficient arrangement and assembly of a tail wheel structure and shimmy dampener structure in which the wheel structure may rotate infinitely in either direction around a spindle axis, with the resulting smaller angle oscillation of the damper shaft displacing hydraulic fluid against flow resistance to dampen the rotary movement of the wheel supporting structure and prevent shimmying thereof. A comparatively short oscillation hydraulic dampener can therefore be efficiently utilized for dampening the rotary movement of a wheel structure throughout a complete cycle of 360°.

We have shown and described practical and efficient embodiments of the features of our invention, but we do not desire to be limited to the exact construction, arrangement, and operation shown and described, as changes and modifications may be made without departing from the scope of the invention.

We claim as follows:

1. An airplane tail wheel and a support therefor rotatable about a vertical axis, a hydraulic dampening structure comprising a cylinder element and a piston element oscillatable therein for displacement of fluid therein, the axis of said dampening structure being vertical, a shaft extending from said piston element, and connecting means between said shaft and said rotatable support operative to translate complete rotary movements of said support through 360° into oscillatory movement of said piston element through a lesser angle for displacement of fluid in said hydraulic dampener and dampening of the rotary movement of said frame.

2. An airplane tail wheel and dampener assembly comprising a wheel and a supporting frame therefor rotatable on one axis, a hydraulic dampening structure of the oscillatory type comprising a cylinder mounted on said frame, and a piston member oscillatable in said cylinder for displacement of hydraulic fluid therein against flow resistance, the axis of said cylinder and piston structure being parallel with the axis of rotation of said frame, and means for translating the rotary movements of said frame in either direction through 360° into oscillatory movement of said piston structure through a lesser angle for displacement of hydraulic fluid in said dampener structure and dampening of the rotation of said frame.

3. An airplane tail wheel and shimmy dampener assembly comprising a tail wheel and a supporting frame therefor, a spindle depending from the airplane body about which said frame is rotatable, a hydraulic dampener of the oscillatory type comprising a cylinder element mounted on said frame and a piston element oscillatable in said cylinder element for displacement of hydraulic fluid against resistance, a shaft extending from said piston element, an arm extending laterally from the end of said shaft, an arm rigidly secured to and extending laterally from the ends of said spindle, a link connecting the ends of said lever arms, the length of said shaft arm being longer than said spindle arm whereby for each complete rotation of said frame through 360° said piston element will be oscillated through a lesser angle range for displacement of the hydraulic fluid in the dampener structure and dampening of the frame rotation.

4. An airplane tail wheel and shimmy dampening assembly comprising a tail wheel and a supporting frame therefor, a spindle on the airplane body around which said frame is rotatable, hydraulic dampening structure comprising a cylinder element rigidly mounted on said frame adjacent to said spindle and a piston element oscillatable in said cylinder element for displacement of hydraulic fluid therein against flow resistance, the oscillation axis of said piston structure being parallel with the spindle axis, an arm rigidly secured to the spindle, a shaft extending from the piston element and an arm at the end of said shaft, and a link connecting the ends of said arms, the lengths of said arms being so proportioned that during complete turning of said frame in either direction through 360° said piston element will be oscillated through a lesser angle range for displacement of the hydraulic fluid for dampening of the rotary movement of said frame.

5. An airplane tail wheel and shimmy dampener assembly comprising a tail wheel and a supporting frame therefor, means on the airplane body supporting said frame for rotation to follow the movement of the wheel over the ground, a hydraulic dampening structure comprising a cylinder element mounted on said frame and a piston element oscillatable in said cylinder element for displacement of hydraulic fluid therein against flow resistance, the axis of said cylinder and piston element being parallel with the axis of rotation of said frame, a shaft for said piston element, an arm extending from said shaft, a link connected at one end to said arm, a support for fulcruming the other end of said link, said support being fixed relative to the airplane body and located a distance from the axis of rotation of said frame, said distance being less than the effective length of said shaft arm whereby during complete turning of said frame in either direction through 360° said shaft will be operated by said link for oscillation of the piston structure through a lesser angle range for displacement of hydraulic fluid in said cylinder and dampening of said frame against shimmying rotation.

6. An airplane tail wheel and dampener assembly comprising the supporting frame on the airplane body providing a bearing, a wheel support having a spindle engageable in said bearing, a hydraulic dampening structure comprising a cylinder element stationarily mounted on said frame and a piston element oscillatable therein for displacement of hydraulic fluid against flow resistance, an arm extending from said piston element and an arm extending from said spindle, and a link connecting the ends of said arms, said piston element arm being longer than said spindle arm whereby during complete rotation in either direction of said spindle through 360° said piston structure will be oscillated through a lesser angle range for displacement of the hydraulic fluid for dampening of the spindle and wheel against shimmying.

7. An airplane tail wheel and dampening assembly comprising a tail wheel and supporting structure therefor rotatable in either direction through 360°, a hydraulic dampener comprising a stationary element and an element oscillatable therein to displace hydraulic fluid against flow resistance, and means transmitting the rotary movements of said supporting structure through 360° to said oscillatory element for oscillation thereof through an angular range of less than 360°.

8. Airplane castor wheel control comprising means supporting the wheel for castoring movement, an arm extending from the wheel, a hydraulic shock absorber comprising a cylinder element and a piston element oscillatable therein, an arm extending from the piston element and a link connecting said arms, said piston arm being longer than the wheel arm whereby said wheel may castor infinitely through 360° while said piston oscillates through a comparatively small angular range, means controllable from a remote point on the plane for positively oscillating said piston for corresponding steering movement of the wheel, and control means in said shock absorber for the flow of fluid displaced by the piston oscillation adjusted to permit comparatively gradual castoring movement of said wheel but to dampen sudden castoring movement to thereby prevent shimmy.

9. Airplane castor wheel control comprising means supporting the wheel for castoring movement, an arm connected with the wheel to follow the castoring movement thereof, a hydraulic shock absorber comprising a cylinder element held against rotation and a piston element oscillatable therein, an arm extending from said piston element and a link connecting said arms whereby castoring movement of the wheel will be converted into oscillatory movement of said piston element in said cylinder for displacement of hydraulic fluid in the cylinder, a steering lever on said piston element operable from a remote point on the plane for positively turning said piston element for corresponding steering movement of the wheel, and means within the shock absorber for controlling the displaced fluid flow to permit comparatively gradual rotation of said piston element and steering of the wheel but to prevent sudden castoring movement of the wheel.

10. Airplane castor wheel control comprising means supporting the wheel for castoring movement, a lever arm connected with the wheel to follow the castoring movement thereof, a hydraulic shock absorber comprising a cylinder element held against rotation and a piston element oscillatable therein through a predetermined angular range, a lever arm extending from said piston element and a link connecting said lever arm with the lever arm connected with said wheel, said piston element lever arm being sufficiently longer than said wheel lever arm whereby said wheel may castor infinitely through 360° while said piston element oscillates within its predetermined angular range, a steering lever structure on said piston element controlled from a remote point on the airplane for positively turning said piston element for corresponding steering movement of the wheel, and means within the shock absorber controlling the flow of the hydraulic fluid therein by said piston element to permit comparatively gradual movement of the piston and the wheel but to prevent sudden movement thereof and to prevent shimmy movement of the wheel.

ELBERT L. POTTER.
BERNARD E. O'CONNOR.